United States Patent
Hosono et al.

(10) Patent No.: US 11,130,521 B2
(45) Date of Patent: Sep. 28, 2021

(54) STEERING CONTROL UNIT

(71) Applicant: JTEKT CORPORATION, Osaka (JP)

(72) Inventors: Hiroshi Hosono, Toyota (JP); Akira Nambu, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 195 days.

(21) Appl. No.: 16/515,558

(22) Filed: Jul. 18, 2019

(65) Prior Publication Data
US 2020/0023898 A1 Jan. 23, 2020

(30) Foreign Application Priority Data

Jul. 23, 2018 (JP) .............................. JP2018-137503

(51) Int. Cl.
  *B62D 15/02* (2006.01)
  *B62D 3/12* (2006.01)
  *B62D 5/04* (2006.01)

(52) U.S. Cl.
  CPC ............ *B62D 15/022* (2013.01); *B62D 3/12* (2013.01); *B62D 5/0457* (2013.01); *B62D 15/0235* (2013.01); *B62D 15/0245* (2013.01)

(58) Field of Classification Search
  CPC .............. B62D 15/0215; B62D 15/022; B62D 15/0235; B62D 15/0245; B62D 3/12; B62D 5/0457; B62D 5/0466
  See application file for complete search history.

(56) References Cited

U.S. PATENT DOCUMENTS

| 2,919,680 | A | * | 1/1960 | Scharringhauser | ..... B30B 15/24 91/523 |
| 5,058,484 | A | * | 10/1991 | Kuttruf | ................... F15B 21/08 91/461 |
| 2004/0019417 | A1 | * | 1/2004 | Yasui | .................. B60W 40/101 701/36 |

(Continued)

FOREIGN PATENT DOCUMENTS

| EP | 2792574 A2 | 10/2014 |
| JP | 2014-210495 A | 11/2014 |

OTHER PUBLICATIONS

Dec. 19, 2019 Search Report issued in European Patent Application No. 19187482.5.

*Primary Examiner* — Behrang Badii
*Assistant Examiner* — Daniel L Greene
(74) *Attorney, Agent, or Firm* — Oliff PLC

(57) ABSTRACT

A steering angle calculation circuit of an ECU includes a neutral point calculation circuit, a correction amount calculation circuit, an adder, and an absolute angle calculation circuit. When started, the neutral point calculation circuit calculates a motor neutral point from a steering angle detected through a steering sensor and a motor rotation angle detected through a relative angle sensor. The correction amount calculation circuit calculates a correction angle that is a difference between a conversion value and an actual value of the motor rotation angle with respect to the steering angle. The conversion value is obtained by converting the steering angle in terms of the motor rotation angle by taking into account a theoretical specific stroke. The adder calculates a final motor neutral point by adding the correction angle calculated by the correction amount calculation circuit to the motor neutral point calculated by the neutral point calculation circuit.

6 Claims, 8 Drawing Sheets

(56) References Cited

U.S. PATENT DOCUMENTS

| | | | |
|---|---|---|---|
| 2005/0027402 A1* | 2/2005 | Koibuchi | B60W 50/00 |
| | | | 701/1 |
| 2008/0243339 A1* | 10/2008 | Nishimori | B60G 7/003 |
| | | | 701/41 |
| 2010/0263961 A1* | 10/2010 | Horiuchi | B62D 17/00 |
| | | | 180/445 |
| 2014/0311817 A1 | 10/2014 | Kita et al. | |
| 2017/0341915 A1* | 11/2017 | Kaneko | B62D 5/09 |
| 2018/0346018 A1* | 12/2018 | Kataoka | B62D 15/0245 |
| 2019/0031229 A1* | 1/2019 | Sakaguchi | B62D 5/0421 |

* cited by examiner

GRAPH A

— · — THEORETICAL SPECIFIC STROKE
—— ACTUAL SPECIFIC STROKE

GRAPH B

STEERING CONTROL UNIT

INCORPORATION BY REFERENCE

The disclosure of Japanese Patent Application No. 2018-137503 filed on Jul. 23, 2018 including the specification, drawings and abstract, is incorporated herein by reference in its entirety.

BACKGROUND OF THE INVENTION

1. Field of the Invention

The invention relates to a steering control unit.

2. Description of Related Art

Japanese Patent Application Publication No. 2014-210495 (JP 2014-210495 A) discloses an electric power steering system (EPS) that supplies a steering mechanism of a vehicle with torque of a motor to assist a driver in steering the vehicle. The steering mechanism has a rack and pinion of a variable gear ratio type. Rotation of a pinion shaft caused by operation of a steering wheel is converted into reciprocating motion of a rack shaft that changes steered angles of steered wheels. A controller of the EPS controls supply of electric current to the motor in accordance with steering torque detected through a torque sensor. On the basis of a steering angle detected through an absolute angle sensor that is used as a steering sensor, the controller performs compensation control such as steering return control that returns the steering wheel to its neutral position.

Absolute angle sensors used as steering sensors may have lower resolution than relative angle sensors, such as resolvers used to detect a rotation angle of the motor. For this reason, the controller calculates the steering angle in terms of absolute angle by using a rotation angle of the motor detected through a relative angle sensor. Specifically, the controller calculates a conversion value by converting the steering angle detected through the absolute angle sensor in terms of the rotation angle of the motor by taking into account a specific stroke. The term "specific stroke" as used herein refers to the distance the rack shaft moves per one rotation of the pinion shaft. Next, the controller calculates a motor neutral point by subtracting the conversion value from the rotation angle of the motor detected through the relative angle sensor. The term "motor neutral point" as used herein refers to the rotation angle of the motor corresponding to the neutral position of the steering wheel. Then, the controller calculates the steering angle in terms of absolute angle on the basis of the motor neutral point and the rotation angle of the motor detected through the relative angle sensor, and performs the compensation control described above using the calculated steering angle (a steering absolute angle).

One concern with the EPS disclosed in JP 2014-210495 A is that, due to dimensional or assembly tolerances of components of the EPS, there may be a difference between a theoretical relationship between the steering angle detected through the absolute angle sensor and the specific stroke when the conversion value is calculated and an actual relationship between the steering angle detected through the absolute angle sensor and the specific stroke when the steering wheel is actually operated. The difference may cause a difference between the motor neutral point calculated using the conversion value and the motor neutral point corresponding to when the steering wheel is actually operated to the steering neutral position. Therefore, the steering angle based on the motor neutral point calculated using the conversion value may deviate from an actual steering angle.

SUMMARY OF THE INVENTION

A purpose of the invention is to provide a steering control unit that ensures accuracy in calculating a steering absolute angle based on a motor rotation angle detected through a relative angle sensor.

An aspect of the invention provides a steering control unit for controlling a motor in accordance with a steering state. The motor is configured to generate power that is supplied to a rack-and-pinion steering mechanism of a variable gear ratio type. The steering control unit includes a steering angle calculation circuit that calculates a motor neutral point by subtracting a conversion value from a rotation angle of the motor detected through a relative angle sensor. The conversion value is obtained by converting a steering angle detected through an absolute angle sensor in terms of the rotation angle of the motor by taking into account a theoretical specific stroke. The motor neutral point is the rotation angle of the motor corresponding to a steering neutral position. The steering angle calculation circuit calculates the steering angle in terms of an absolute angle on the basis of the calculated motor neutral point and the rotation angle of the motor detected through the relative angle sensor. In order to reduce an influence of a deviation between the theoretical specific stroke and an actual specific stroke with respect to the steering angle detected through the absolute angle sensor on the calculation of the motor neutral point, the steering angle calculation circuit calculates a correction amount for the motor neutral point in accordance with the deviation.

Due to dimensional or assembly tolerances of components of the steering mechanism, the actual specific stroke may deviate from the theoretical specific stroke with respect to the steering angle. Accordingly, the motor neutral point that is calculated using the conversion value based on the theoretical specific stroke may deviate from an actual motor neutral point. In this regard, according to the above aspect, the correction amount for the motor neutral point is calculated in accordance with the deviation between the theoretical and actual specific strokes with respect to the steering angle in order to reduce the influence of the deviation on calculation of the motor neutral point. Using a final motor neutral point that reflects the correction amount ensures accuracy in calculating the steering absolute angle based on the rotation angle of the motor detected through the relative angle sensor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

In a first embodiment described below, a steering control unit according to the invention is embodied in a controller of an electric power steering system (EPS) 1.

Figure 1:
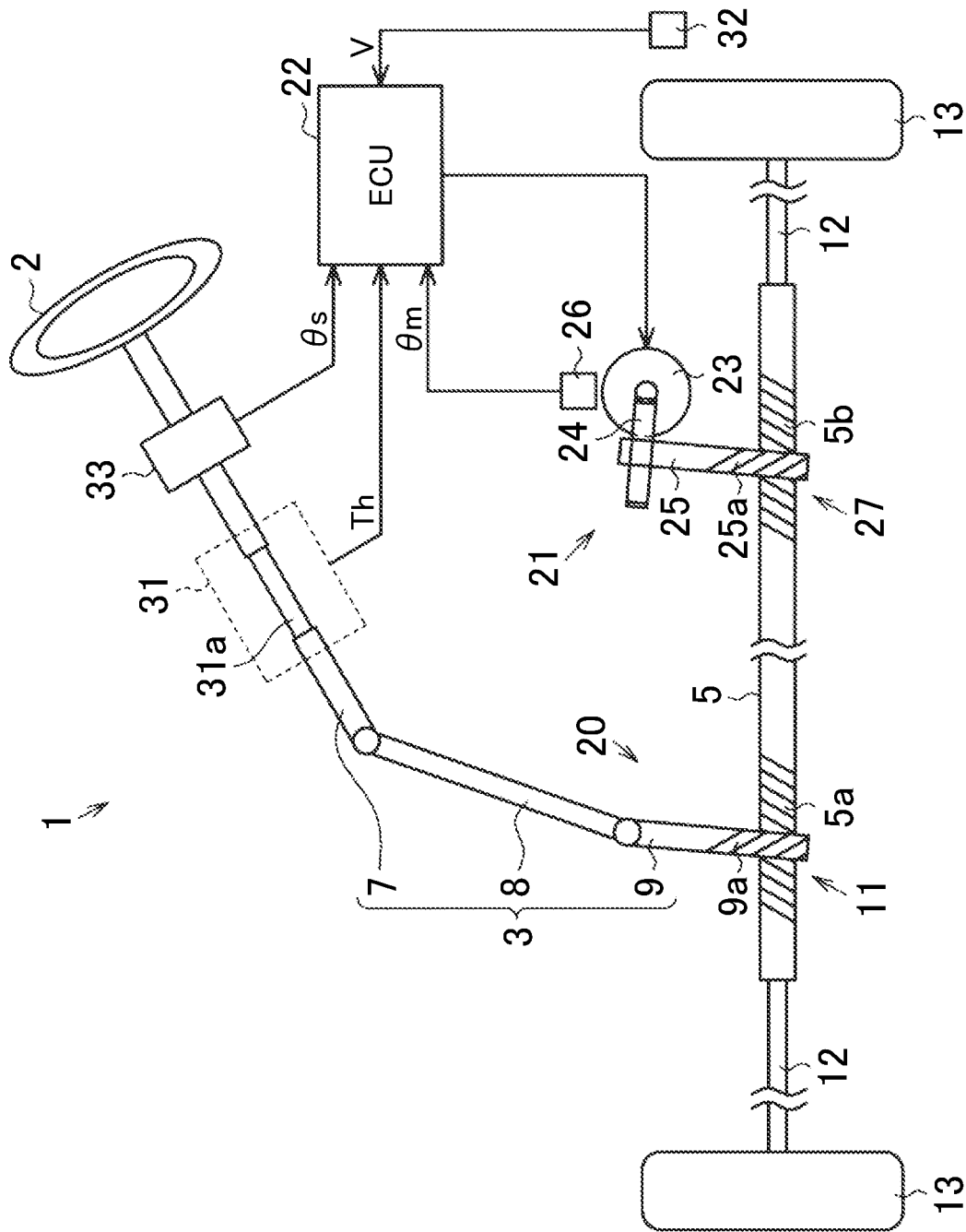
FIG. 1 is a diagram schematically illustrating an electric power steering system including a steering control unit according to a first embodiment.

As illustrated in FIG. 1, the EPS 1 includes the following: a steering mechanism 20 that changes the direction of travel of a vehicle on the basis of a steering operation by a driver; a steering assist mechanism 21 that assists a driver in performing the steering operation; and an electronic control unit (ECU) 22 that serves as a steering control unit for controlling actuation of the steering assist mechanism 21.

As illustrated in FIG. 1, the steering mechanism 20 includes a steering shaft 3 fixed to a steering wheel 2, and a rack shaft 5 that axially reciprocates in accordance with rotation of the steering shaft 3. The steering shaft 3 includes a column shaft 7 fixed to the steering wheel 2, an intermediate shaft 8 coupled to the column shaft 7, and a pinion shaft 9 coupled to the intermediate shaft 8. The rack shaft 5 and the pinion shaft 9 intersect each other. Pinion teeth 9a of the pinion shaft 9 mesh with first rack teeth 5a of the rack shaft 5, thus forming a first rack and pinion mechanism 11. Each end of the rack shaft 5 is coupled to a knuckle of a steered wheel 13 via a tie rod 12. Thus, the rotation of the steering shaft 3 caused by the rotation of the steering wheel 2 is converted by the first rack and pinion mechanism 11 to axial reciprocating motion of the rack shaft 5, and the reciprocating motion is transmitted to the knuckles via the tie rods 12 and changes steered angles of the steered wheels 13.

The first rack and pinion mechanism 11 is of a variable gear ratio type. That is, in a portion of the rack shaft 5 where the first rack teeth 5a are formed, specifications (tooth pitch, pressure angle, etc.) of the first rack teeth 5a are set such that a specific stroke continuously increases from near the middle corresponding to a steering neutral position of the steering wheel 2 toward stroke ends corresponding to right and left steering limit positions. The term "specific stroke" as used herein refers to the distance the rack shaft 5 moves per one rotation of the pinion shaft 9 (the steering wheel 2). A steering angle $\theta s$ and the specific stroke have the following relationship.

Figure 2:
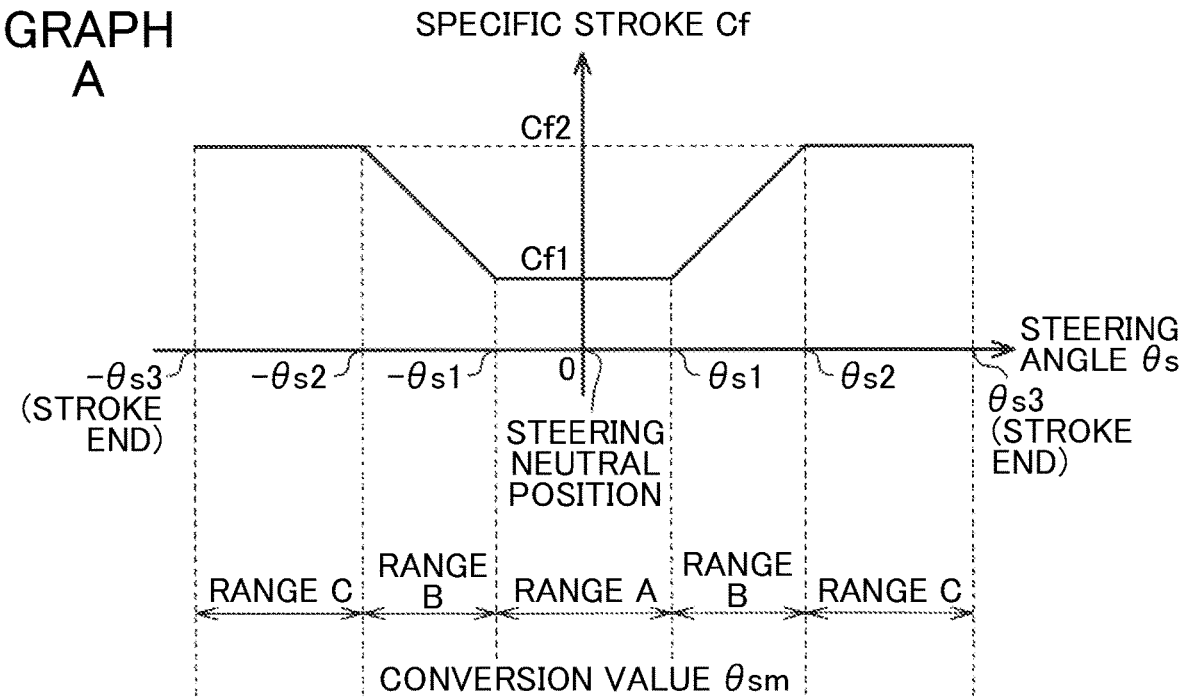
FIG. 2 illustrates graph A showing a relationship between a steering angle and a specific stroke according to the first embodiment, and graph B showing a map defining a relationship between the steering angle and a conversion value according to the first embodiment.
Figure 2:
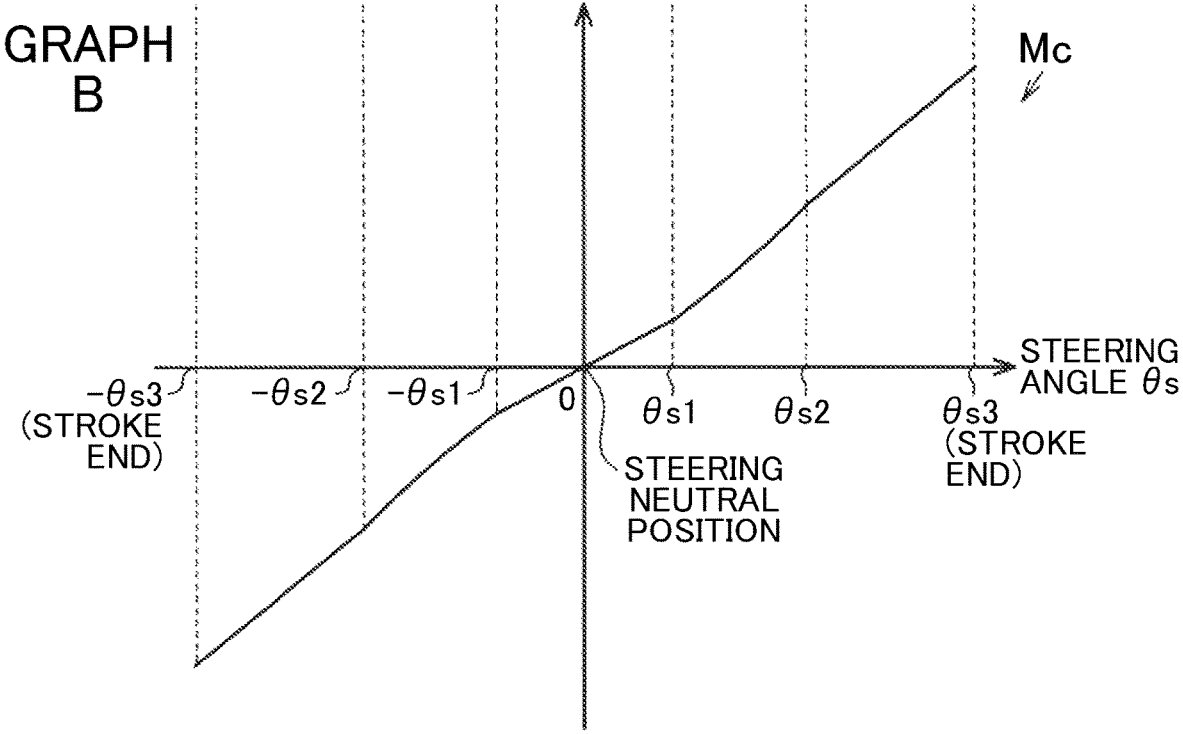

As shown in graph A of FIG. 2, in a region A that is in the proximity of the steering neutral position and where the absolute value of the steering angle $\theta s$ is less than or equal to a first steering angle value $\theta s1$, the specific stroke Cf is constant at a first specific stroke value Cf1. In a region B where the absolute value of the steering angle $\theta s$ is greater than the first steering angle value $\theta s1$ and less than or equal to a second steering angle value $\theta s2$, the specific stroke Cf gradually increases with an increase in the absolute value of the steering angle $\theta s$. In a region C that is in the proximity of a stroke end and where the absolute value of the steering angle $\theta s$ is greater than the second steering angle value $\theta s2$ and less than or equal to a third steering angle value $\theta s3$, the specific stroke Cf is constant at a second specific stroke value Cf2. The second specific stroke value Cf2 is greater than the first specific stroke value Cf1.

In graph A of FIG. 2, the steering angle $\theta s$ has a positive value when the steering wheel 2 is turned to the right with respect to the steering neutral position where the steering angle $\theta s$ is zero, and has a negative value when the steering wheel 2 is turned to the left. By setting the specific stroke Cf with respect to the steering angle $\theta s$ in this way, as the absolute value of the steering angle $\theta s$ becomes greater, the steered angles of the steered wheels 13 change more greatly. This improves steerability of the steering wheel 2 during stationary steering or during low speed travel while ensuring the steerability during straight travel or during high speed travel.

As illustrated in FIG. 1, the steering assist mechanism 21 includes a motor 23 as its drive source, and a pinion shaft 25 that is coupled to the motor 23 via a speed reduction mechanism 24 such as a worm and wheel mechanism. The motor 23 may be, for example, a three-phase brushless motor. The motor 23 is provided with a relative angle sensor 26 such as a resolver. The relative angle sensor 26 detects a rotation angle $\theta m$ of the motor 23 as a relative angle in a range of 360 degrees. The rack shaft 5 and the pinion shaft 25 intersect each other. Pinion teeth 25a of the pinion shaft 25 mesh with second rack teeth 5b of the rack shaft 5, thus forming a second rack and pinion mechanism 27 that serves as a power conversion mechanism. The speed reduction mechanism 24 transmits rotational force of the motor 23 to the pinion shaft 25 while reducing the speed of rotational output of the motor 23. Rotation of the pinion shaft 25 is converted by the second rack and pinion mechanism 27 to axial reciprocating motion of the rack shaft 5 so as to assist a driver in operating the steering wheel 2.

Specifications of the second rack teeth 5b are constant all over a portion of the rack shaft 5 where the second rack teeth 5b are formed. The ECU 22 controls actuation of the motor 23 on the basis of results of detection made by in-vehicle sensors. Examples of the in-vehicle sensors include, in addition to the relative angle sensor 26 mentioned above, a torque sensor 31, a vehicle speed sensor 32, and a steering sensor 33. The torque sensor 31 includes a torsion bar 31a mounted to the column shaft 7. The torque sensor 31 detects a steering torque Th applied to the steering shaft 3, on the basis of the twist angle of the torsion bar 31a. The vehicle speed sensor 32 detects a vehicle speed V that is the traveling speed of the vehicle. The steering sensor 33 is mounted to the column shaft 7 and is located between the torque sensor 31 and the steering wheel 2. The steering sensor 33 is an absolute angle sensor and detects the steering angle $\theta s$ as an absolute angle in a range of more than 360 degrees. The steering angle $\theta s$ is a rotation angle of the steering wheel 2 (the steering shaft 3).

The ECU 22 calculates target assist force on the basis of the steering torque Th and the vehicle speed V and controls supply of electric power to the motor 23 such that the steering assist mechanism 21 generates the target assist force. Further, the ECU 22 calculates a steering absolute angle on the basis of the steering angle θs detected through the steering sensor 33 and the rotation angle θm of the motor 23 detected through the relative angle sensor 26. Using the steering absolute angle, the ECU 22 performs compensation control that achieves better steering feel.

Figure 3:
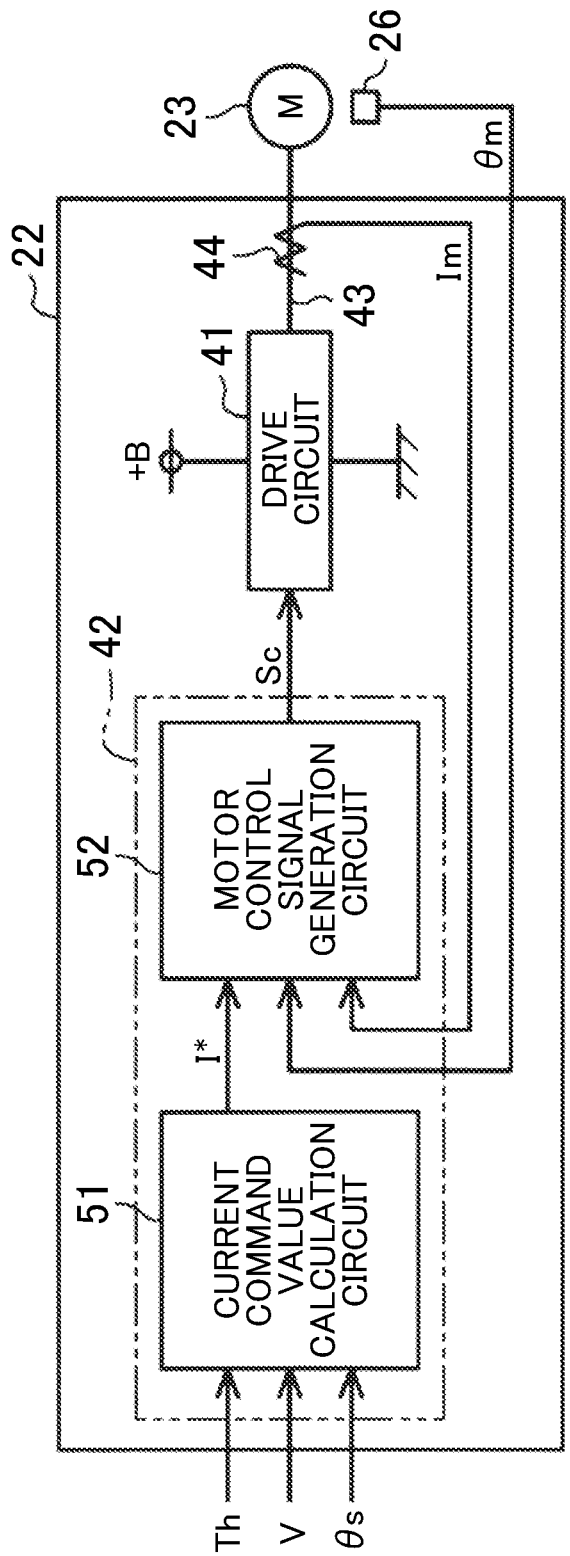
FIG. 3 is a control block diagram of an electronic control unit (ECU) according to the first embodiment.

Next, the ECU 22 is described in detail. As illustrated in FIG. 3, the ECU 22 includes a drive circuit (an inverter circuit) 41 and a micro-processing unit (MPU) 42.

The drive circuit 41 converts direct current (DC) power, supplied from a battery (+B) as a DC power source, to three-phase alternating current (AC) power on the basis of a motor control signal Sc (a PWM drive signal) generated by the MPU 42. The three-phase AC power is supplied to the motor 23 through a power supply line 43 of each phase. The power supply line 43 of each phase is provided with a current sensor 44. Each current sensor 44 detects an actual current value Im of electric current flowing through the power supply line 43 of the corresponding phase.

The MPU 42 includes a current command value calculation circuit 51 and a motor control signal generation circuit 52. The current command value calculation circuit 51 calculates a current command value I* on the basis of the steering torque Th and the vehicle speed V. The current command value I* is a target value for the current that needs to be supplied to the motor 23 in order to generate the target assist force with an appropriate magnitude corresponding to the steering torque Th and the vehicle speed V. On the basis of the current command value I*, the actual current value Im, and the rotation angle θm of the motor 23, the motor control signal generation circuit 52 performs current feedback control that causes the actual current value Im to follow the current command value I*. The motor control signal generation circuit 52 calculates a deviation between the current command value I* and the actual current value Im, and generates the motor control signal Sc that eliminates the deviation. The current corresponding to the motor control signal Sc is supplied through the drive circuit 41 to the motor 23, so that the motor 23 generates the rotational force corresponding to the target assist force.

Figure 4:
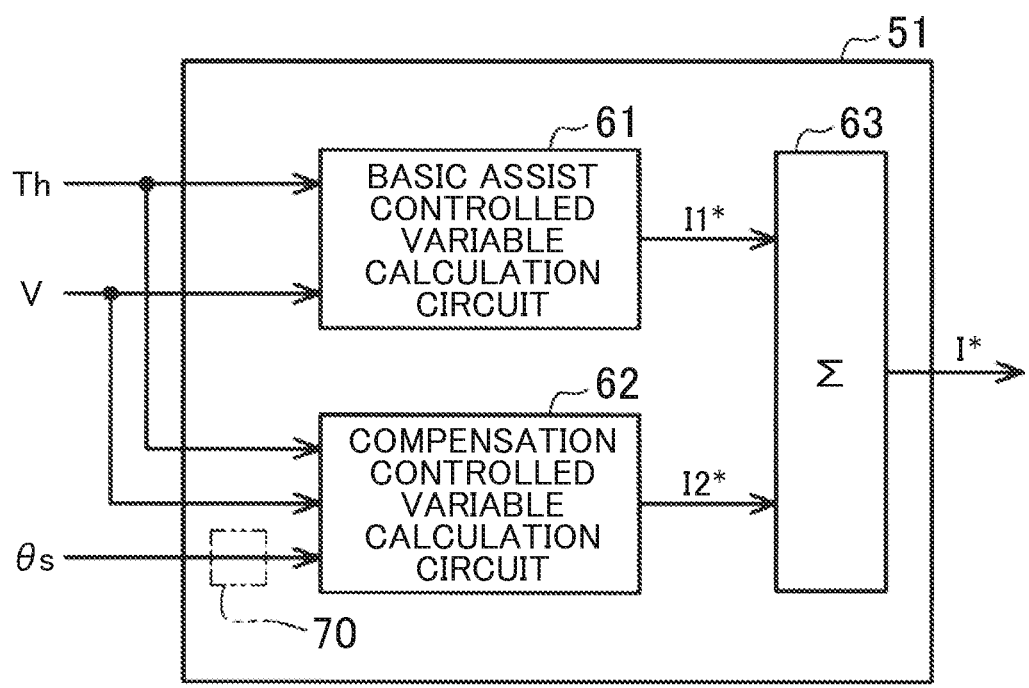
FIG. 4 is a control block diagram of a current command value calculation circuit according to the first embodiment.

Next, details of the current command value calculation circuit 51 are described. As illustrated in FIG. 4, the current command value calculation circuit 51 includes a basic assist controlled variable calculation circuit 61, a compensation controlled variable calculation circuit 62, and an adder 63.

On the basis of the steering torque Th and the vehicle speed V, the basic assist controlled variable calculation circuit 61 calculates a basic assist controlled variable I1* (an electric current value) as a first component of the current command value I*. The basic assist controlled variable I1* is a basic component that is used to generate the target assist force with an appropriate magnitude corresponding to the steering torque Th and the vehicle speed V. The basic assist controlled variable calculation circuit 61 calculates the basic assist controlled variable I1* using an assist characteristic map stored in a memory device (not illustrated) of the ECU 22. The assist characteristic map is a vehicle speed-sensitive three-dimensional map for calculating the basic assist controlled variable I1* on the basis of the steering torque Th and the vehicle speed V. The assist characteristic map is set such that the basic assist controlled variable I1* increases (in absolute value) as the absolute value of the steering torque Th increases and as the vehicle speed V decreases.

The compensation controlled variable calculation circuit 62 applies compensation control to the basic assist controlled variable I1* to achieve better steering feel. Examples of the compensation control may include steering return control that returns the steering wheel 2 to the steering neutral position.

The compensation controlled variable calculation circuit 62 calculates a compensation controlled variable I2* (a current value) for compensating for return characteristics of the steering wheel 2, on the basis of the steering torque Th, the vehicle speed V, and the steering angle θs (or a steering velocity ωs). The compensation controlled variable I2* is a second component of the current command value I*.

The adder 63 adds the compensation controlled variable I2* to the basic assist controlled variable I1* so as to correct the basic assist controlled variable I1*, thereby calculating the current command value I*. Correcting the basic assist controlled variable I1* using the compensation controlled variable I2* in this way compensates for excess or deficiency of self-aligning torque due to road surface reaction force. This is because assist force in a direction that returns the steering wheel 2 to the steering neutral position is generated in accordance with the compensation controlled variable I2*.

Some absolute angle sensors have lower resolution than relative angle sensors, and therefore, the steering sensor 33 serving as an absolute angle sensor may have lower resolution than the relative angle sensor 26 that detects the rotation angle θm of the motor 23. For this reason, as indicated by a long dashed double-short dashed line in FIG. 4, the current command value calculation circuit 51 includes a steering angle calculation circuit 70. The steering angle calculation circuit 70 calculates a steering absolute angle on the basis of the rotation angle θm of the motor 23 detected through the relative angle sensor 26. The steering absolute angle is calculated as an absolute angle in a range of more than 360 degrees and is used, instead of the steering angle θs, in the compensation controlled variable calculation circuit 62. The compensation controlled variable calculation circuit 62 calculates the compensation controlled variable I2* using the steering absolute angle calculated by the steering angle calculation circuit 70.

Figure 5:
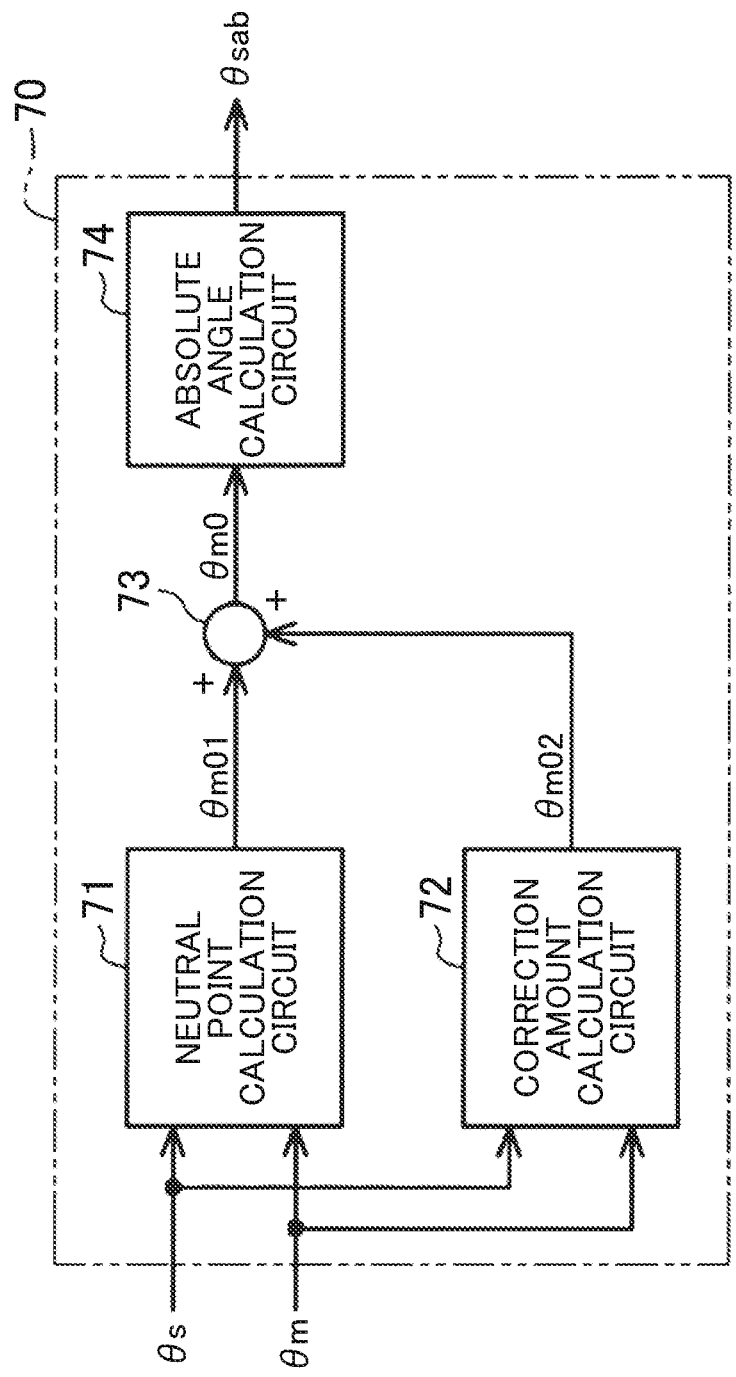
FIG. 5 is a control block diagram of a steering angle calculation circuit according to the first embodiment.

Next, details of the steering angle calculation circuit 70 are described. As illustrated in FIG. 5, the steering angle calculation circuit 70 includes a neutral point calculation circuit 71, a correction amount calculation circuit 72, an adder 73, and an absolute angle calculation circuit 74.

Immediately after a drive source for propelling the vehicle is started, the neutral point calculation circuit 71 calculates a motor neutral point θm01 using the steering angle θs detected through the steering sensor 33 and the rotation angle θm of the motor 23 detected through the relative angle sensor 26. The motor neutral point θm01 is the rotation angle θm of the motor 23 corresponding to a steering neutral point that is the steering angle θs of the steering wheel 2 in the steering neutral position when the vehicle travels straight. The neutral point calculation circuit 71 calculates the motor neutral point θm01 using a conversion map Mc stored in a memory device (not illustrated) of the ECU 22.

As shown in graph B of FIG. 2, the conversion map Mc defines a relationship between the steering angle θs detected through the steering sensor 33 and a conversion value θsm. The conversion value θsm is obtained by converting the steering angle θs detected through the steering sensor 33 in terms of the rotation angle θm of the motor 23 by taking into account a theoretical value of the specific stroke Cf. Specifically, the conversion value θsm is calculated by multiplying the detected steering angle θs by a ratio of the amount of rotation of the motor 23 to the amount of rotation of the steering shaft 3 corresponding to the detected steering angle θs.

The conversion map Mc has the following characteristics. In range A where the specific stroke Cf is constant at the first specific stroke value Cf1, the absolute value of the conversion value θsm increases linearly as the absolute value of the steering angle θs increases on the basis of the first specific stroke value Cf1. In range B where the specific stroke Cf increases continuously as the absolute value of the steering angle θs increases, the absolute value of the conversion value θsm increases nonlinearly as the absolute value of the steering angle θs increases. This is because the ratio of the amount of rotation of the motor 23 to the amount of rotation of the steering shaft 3 changes with a change in the specific stroke Cf. In range C where the specific stroke Cf is constant at the second specific stroke value Cf2, the absolute value of the conversion value θsm increases linearly as the absolute value of the steering angle θs increases on the basis of the second specific stroke value Cf2.

The neutral point calculation circuit 71 calculates the motor neutral point θm01 by subtracting the conversion value θsm obtained on the basis of the conversion map Mc from the rotation angle θm of the motor 23 detected through the relative angle sensor 26, as indicated by the following formula (A): θm01=θm−θsm . . . (A). It is noted that the neutral point calculation circuit 71 stops calculation of the motor neutral point θm01 after calculating the motor neutral point θm01 once.

As described above, the motor neutral point θm01 is calculated by taking into account a change in the specific stroke Cf with respect to the steering angle θs. Thus, in theory, the accuracy in calculating the motor neutral point θm01 is ensured, regardless of the value of the steering angle θs when the motor neutral point θm01 is calculated. That is, the motor neutral point θm01 calculated on the basis of the formula (A) approximates an actual motor neutral point that is the rotation angle θm of the motor 23 corresponding to when the steering wheel 2 is actually steered to the steering neutral position.

As described below, however, there is a concern with the neutral point calculation circuit 71. As shown in graph A of FIG. 6, due to dimensional or assembly tolerances of components of the EPS 1, an actual relationship between the steering angle θs and the specific stroke Cf indicated by characteristic lines L1 and L2 each represented by a continuous line may deviate from a theoretical relationship between the steering angle θs and the specific stroke Cf indicated by a characteristic line L0 represented by a long dashed double-short dashed line. In particular, in the range (i.e., in range B shown in graph A of FIG. 2) where the specific stroke Cf changes with a change in the steering angle θs, the dimensional or assembly tolerances of components of the EPS 1 have greater influence on the specific stroke Cf.

For example, as indicated by the characteristic line L1, an actual value of the specific stroke Cf with respect to the absolute value of the steering angle θs may become smaller than a theoretical value of the specific stroke Cf indicated by the characteristic line L0. In this case, there is a difference δ1 between the actual and theoretical values of the specific stroke Cf with respect to the absolute value of the steering angle θs. However, when the absolute value of the steering angle θs is less than or equal to the first steering angle value θs1, or when the absolute value of the steering angle θs is greater than or equal to a fourth steering angle value θs4 that is greater than the second steering angle value θs2, the actual and theoretical values of the specific stroke Cf with respect to the absolute value of the steering angle θs are equal to each other.

As another example, the actual value of the specific stroke Cf indicated by the characteristic line L2 may become greater than the theoretical value of the specific stroke Cf indicated by the characteristic line L0, with respect to the absolute value of the steering angle θs. In this case, there is a difference δ2 between the actual and theoretical values of the specific stroke Cf with respect to the absolute value of the steering angle θs. However, when the absolute value of the steering angle θs is less than or equal to a fifth steering angle value θs5 that is less than the first steering angle value θs1, or when the absolute value of the steering angle θs is greater than or equal to the second steering angle value θs2, the actual and theoretical values of the specific stroke Cf with respect to the absolute value of the steering angle θs are equal to each other.

Figure 6:
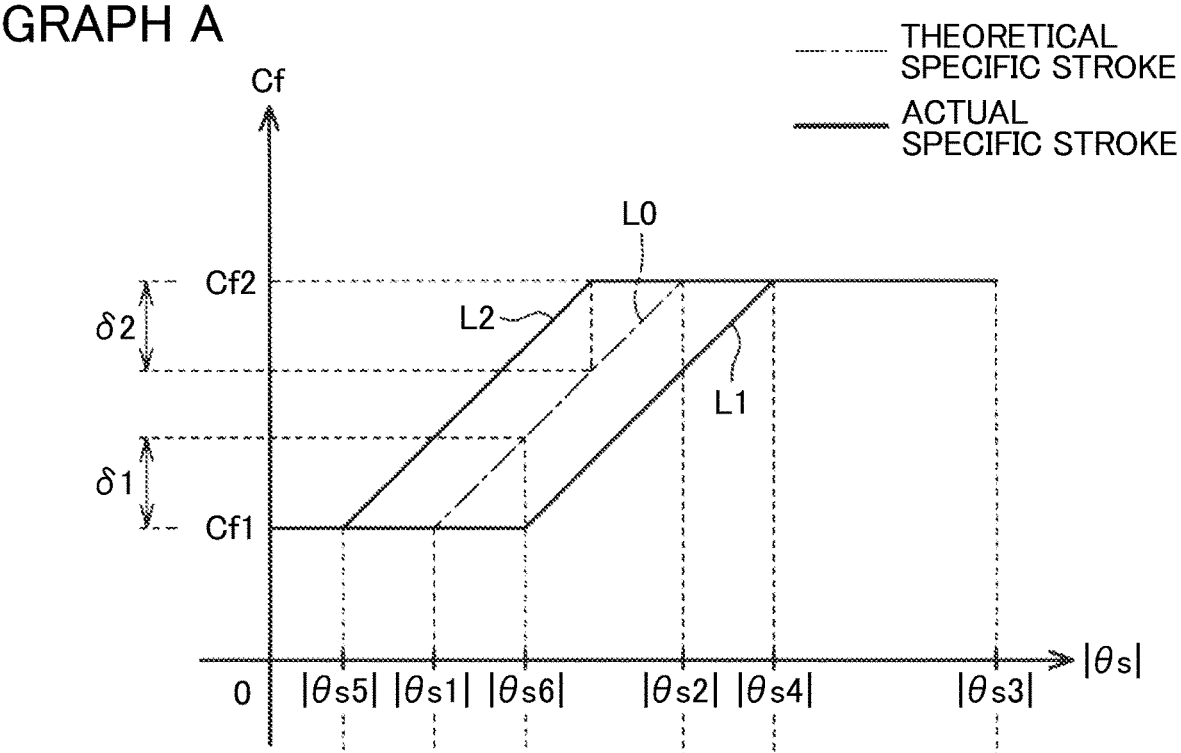
FIG. 6 illustrates graph A showing a relationship between a steering angle and a specific stroke according to the first embodiment, and graph B showing a map defining a relationship between the steering angle and a conversion value according to the first embodiment.
Figure 6:
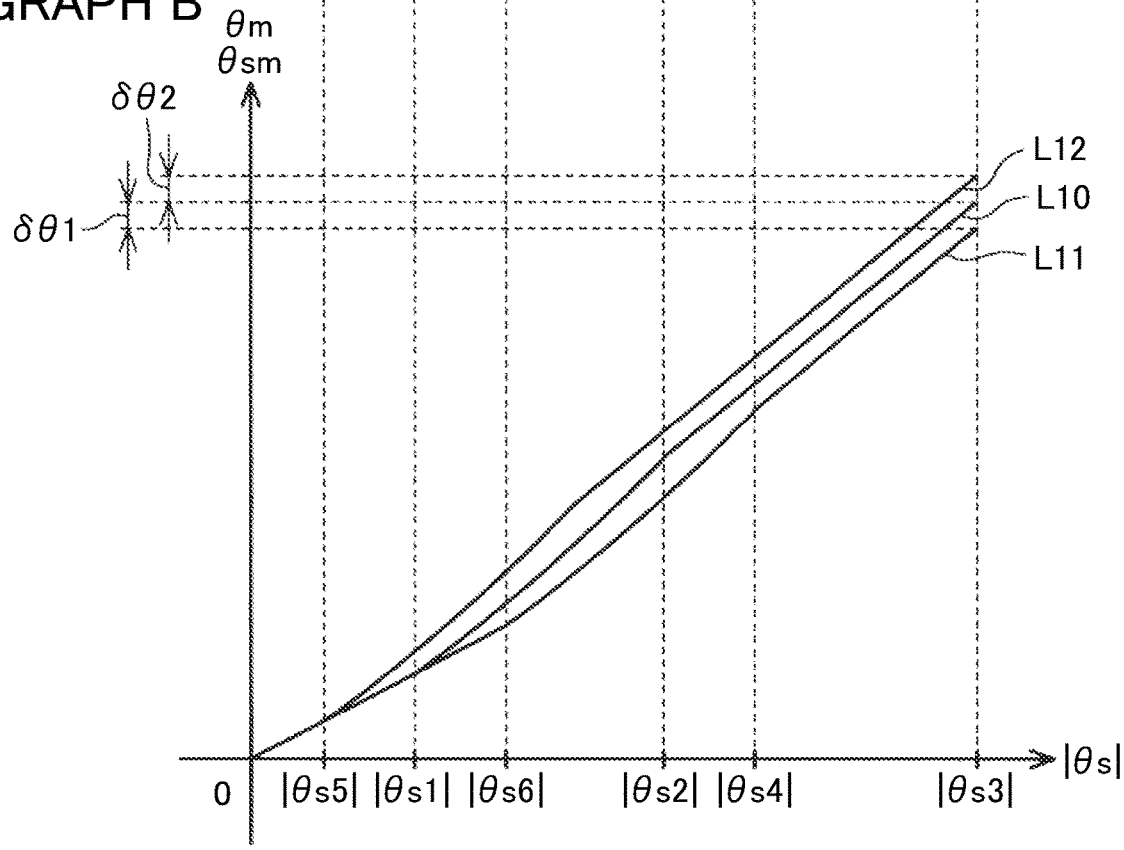

In summary, in the example shown in graph A of FIG. 6, the difference between the actual and theoretical values of the specific stroke Cf with respect to the steering angle θs may occur when the absolute value of the steering angle θs falls outside the following ranges (B) and (C): 0≤|θs|≤|θs5| . . . (B); |θs4|≤|θs|≤|θs3| . . . (C).

The conversion map Mc defines the relationship between the steering angle θs detected through the steering sensor 33 and the conversion value θsm that is obtained by converting the detected steering angle θs in terms of the rotation angle θm of the motor 23 by taking into account the theoretical value of the specific stroke Cf. Therefore, there is a possibility that a theoretical relationship between the steering angle θs and the conversion value θsm (in terms of the rotation angle θm of the motor 23) defined in the conversion map Mc may deviate from an actual relationship between the steering angle θs and the rotation angle θm of the motor 23.

For example, as shown in graph A of FIG. 6, when the actual value of the specific stroke Cf indicated by the characteristic line L1 is smaller than the theoretical value of the specific stroke Cf indicated by the characteristic line L0, with respect to the absolute value of the steering angle θs, the actual value of the rotation angle θm of the motor 23 and the theoretical value of the conversion value θsm have the following relationship. That is, as shown in graph B of FIG. 6, the actual value of the rotation angle θm of the motor 23 indicated by a characteristic line L11 becomes smaller than the theoretical value of the conversion value θsm indicated by a characteristic line L10, with respect to the absolute value of the steering angle θs. In this case, there is a difference δ01 between the actual value of the rotation angle θm of the motor 23 indicated by the characteristic line L11 and the theoretical value of the conversion value θsm indicated by the characteristic line L10.

As another example, as shown in graph A of FIG. 6, when the actual value of the specific stroke Cf indicated by the characteristic line L2 is greater than the theoretical value of the specific stroke Cf indicated by the characteristic line L0, with respect to the absolute value of the steering angle θs, the actual value of the rotation angle θm of the motor 23 and the theoretical value of the conversion value θsm have the following relationship. That is, as shown in graph B of FIG. 6, the actual value of the rotation angle θm of the motor 23 indicated by a characteristic line L12 becomes greater than the theoretical value of the conversion value θsm indicated by the characteristic line L10, with respect to the absolute value of the steering angle θs. In this case, there is a difference δ02 between the actual value of the rotation angle θm of the motor 23 indicated by the characteristic line L12 and the theoretical value of the conversion value θsm indicated by the characteristic line L10.

Therefore, due to the dimensional or assembly tolerances of components of the EPS 1, the motor neutral point θm01 obtained using the conversion value θsm that is based on the conversion map Mc may deviate from the actual motor neutral point.

In order to reduce the influence of the deviation between the theoretical and actual values of the specific stroke Cf with respect to the steering angle θs on calculation of the motor neutral point θm01, the steering angle calculation circuit 70 includes the correction amount calculation circuit 72 and the adder 73.

The correction amount calculation circuit 72 calculates a correction angle θm02 using the steering angle θs detected through the steering sensor 33 and the rotation angle θm of the motor 23 detected through the relative angle sensor 26. The correction angle θm02 is used to correct the motor neutral point θm01 calculated by the neutral point calculation circuit 71 and is calculated to have a value that eliminates the difference between the theoretical value of the conversion value θsm (in terms of the rotation angle θm of the motor 23) and the actual value of the rotation angle θm of the motor 23 with respect to the steering angle θs.

The correction amount calculation circuit 72 calculates a theoretical value of the rotation angle θm of the motor 23 corresponding to the steering angle θs detected through the steering sensor 33 (=conversion value θsm). For example, using the following formula (D), the correction amount calculation circuit 72 calculates the theoretical value of the rotation angle θm of the motor 23: θm (theoretical value)= θm×Gr ... (D).

In the formula (D), "Gr" represents a total speed reduction ratio that is the sum of the speed reduction ratio of the first rack and pinion mechanism 11, the speed reduction ratio of the second rack and pinion mechanism 27, and the speed reduction ratio of the speed reduction mechanism 24. The speed reduction ratio of the first rack and pinion mechanism 11 is calculated as follows. First, a theoretical value of the specific stroke Cf corresponding to the steering angle θs detected through the steering sensor 33 is determined from the relationship between the absolute value of the steering angle θs and the specific stroke Cf shown in graph A of FIG. 6. Then, the speed reduction ratio of the first rack and pinion mechanism 11 is calculated (converted) on the basis of the theoretical value of the specific stroke Cf. The relationship between the absolute value of the steering angle θs and the specific stroke Cf shown in graph A of FIG. 6 is prestored in a memory device of the ECU 22.

The correction amount calculation circuit 72 calculates the correction angle θm02 by subtracting the theoretical value of the rotation angle θm of the motor 23 calculated on the basis of the formula (D) from the actual value of the rotation angle θm of the motor 23 detected through the relative angle sensor 26 as calculated using the following formula (E): θm02=θm (actual value)−θm (theoretical value) ... (E). Thus, the correction angle θm02 has a value equal or approximate to the difference δθ1 or βθ2 (refer to graph B of FIG. 6), due to the dimensional or assembly tolerances of components of the EPS 1, between the actual value of the rotation angle θm of the motor 23 and the theoretical value of the conversion value θsm (in terms of the rotation angle θm of the motor 23) with respect to the steering angle θs.

The adder 73 adds together the motor neutral point θm01 calculated by the neutral point calculation circuit 71 and the correction angle θm02 calculated by the correction amount calculation circuit 72 so as to correct the motor neutral point θm01, thereby calculating a final motor neutral point θm0.

Using the final motor neutral point θm0 calculated by the adder 73, the absolute angle calculation circuit 74 calculates a steering absolute angle θsab on the basis of the rotation angle θm of the motor 23. Specifically, the absolute angle calculation circuit 74 calculates the rotation angle θm of the motor 23 as an absolute value in a range of more than 360 degrees on the basis of the amount of change in the rotation angle θm of the motor 23 with respect to the final motor neutral point θm0 as a reference point, thereby calculating the steering absolute angle θsab.

The motor 23 and the steering shaft 3 operate synchronously with each other via the first rack and pinion mechanism 11, the second rack and pinion mechanism 27, and the speed reduction mechanism 24. This provides a correlation between the rotation angle θm of the motor 23 and the steering angle θs that is the rotation angle of the steering shaft 3 (the steering wheel 2). Therefore, the steering absolute angle θsab can be calculated on the basis of the rotation angle θm of the motor 23.

The approach of using the correction angle θm02 calculated by the correction amount calculation circuit 72 to correct the motor neutral point θm01 calculated by the neutral point calculation circuit 71 yields the following advantages.

Since the correction angle θm02 calculated by the correction amount calculation circuit 72 is added to the motor neutral point θm01 calculated by the neutral point calculation circuit 71, the final motor neutral point θm0 is made equal or approximate to the actual motor neutral point. This is because the absolute value of the correction angle θm02 is equal or approximate to the absolute value of the difference δθ1, δθ2 between the theoretical value of the conversion value θsm and the actual value of the rotation angle θm of the motor 23.

Adding the correction angle θm02 to the motor neutral point θm01 calculated by the neutral point calculation circuit 71 as indicated by the following formula (F) is the same as adding the correction angle θm02 to the theoretical value of the conversion value θsm: θm01+θm02=(θm−θsm)+θm02=θm−(θsm+θm02) ... (F). The formula (F) is based on the formula (A).

For example, when the actual value of the conversion value θsm is a positive value indicated by the characteristic line L11, the theoretical value of the conversion value θsm indicated by the characteristic line L10 is greater than the actual value of the conversion value θsm indicated by the characteristic line L11. Thus, the correction angle θm02 calculated on the basis of the formula (E) becomes a negative value corresponding to the difference δθ1 between the actual value of the conversion value θsm indicated by the characteristic line L11 and the theoretical value of the conversion value θsm indicated by the characteristic line L10. Therefore, adding the correction angle θm02 as a negative value to the theoretical value of the conversion value θsm indicated by the characteristic line L10 corrects the theoretical value of the conversion value θsm indicated by the characteristic line L10 to the actual value of the conversion value θsm indicated by the characteristic line L11. In other words, the relationship between the absolute value of the steering angle θs and the absolute value of the conversion value θsm changes from the characteristic indicated by the characteristic line L10 to a characteristic equal or approximate to the characteristic indicated by the characteristic line L11. Thus, the final motor neutral point θm0 that is obtained by substituting the actual value of the conversion value θsm into the formula (A) corresponds to the actual value of the specific stroke Cf that accommodates the dimensional or assembly tolerances of components of the EPS 1, not to the theoretical value of the specific stroke Cf with respect to the absolute value of the steering angle θs.

On the other hand, when the actual value of the conversion value θsm is a positive value indicated by the characteristic line L12, the theoretical value of the conversion value θsm indicated by the characteristic line L10 is smaller than the actual value of the conversion value θsm indicated by the characteristic line L12. Thus, the correction angle θm02 calculated on the basis of the formula (E) becomes a positive value corresponding to the difference δθ2 between the actual value of the conversion value θsm indicated by the characteristic line L12 and the theoretical value of the conversion value θsm indicated by the characteristic line L10. Therefore, adding the correction angle θm02 as a positive value to the theoretical value of the conversion value θsm indicated by the characteristic line L10 corrects the theoretical value of the conversion value θsm indicated by the characteristic line L10 to the actual value of the conversion value θsm indicated by the characteristic line L12. In other words, the relationship between the absolute value of the steering angle θs and the absolute value of the conversion value θsm changes from the characteristic indicated by the characteristic line L10 to a characteristic equal or approximate to the characteristic indicated by the characteristic line L12. Thus, the final motor neutral point θm0 that is obtained by substituting the actual value of the conversion value θsm into the formula (A) corresponds to the actual value of the specific stroke Cf that accommodates the dimensional or assembly tolerances of components of the EPS 1, not to the theoretical value of the specific stroke Cf with respect to the absolute value of the steering angle θs.

In summary, the first embodiment has the following advantages. (1) In order to reduce the influence of a deviation between the theoretical and actual values of the specific stroke Cf with respect to the steering angle θs on calculation of the motor neutral point θm0, the correction angle θm02 that is used to correct the motor neutral point θm01 calculated by the neutral point calculation circuit 71 is calculated in accordance with the deviation. The final motor neutral point θm0 that reflects the correction angle θm02 accommodates the dimensional or assembly tolerances of components of the EPS 1 and thus becomes more accurate. Using this more accurate final motor neutral point θm0 improves the accuracy in calculating the steering absolute angle θsab based on the rotation angle θm of the motor 23 detected through the relative angle sensor 26.

(2) The deviation between the theoretical and actual values of the specific stroke Cf with respect to the steering angle θs detected through the steering sensor 33 appears as a difference between the conversion value θsm (in terms of the rotation angle θm of the motor 23) based on the theoretical value of the specific stroke Cf and the actual value of the rotation angle θm of the motor 23 with respect to the steering angle θs. Therefore, when the difference between the conversion value θsm based on the theoretical value of the specific stroke Cf and the actual value of the rotation angle θm of the motor 23 with respect to the steering angle θs is reflected as the correction angle θm02 in the motor neutral point θm01 calculated by the neutral point calculation circuit 71, the final motor neutral point θm0 becomes more accurate.

(3) The difference between the theoretical value of the rotation angle θm of the motor 23 calculated on the basis of the formula (D) and the actual value of the rotation angle θm of the motor 23 detected through the relative angle sensor 26 is calculated as the correction angle θm02. By virtue of this structure, the motor neutral point θm01 calculated by the neutral point calculation circuit 71 is corrected instantly over an entire steering range of the steering wheel 2 that is from the steering neutral position to the right and left steering limit positions.

(4) The correction is achieved simply by adding the correction amount calculation circuit 72 and the adder 73 to the current command value calculation circuit 51. This ensures the accuracy of the final motor neutral point θm0, which in turn, ensures the accuracy of the steering absolute angle θsab, without complicating the structure of the ECU 22.

Next, a steering control unit according to a second embodiment is described. The second embodiment basically has the same structure as the first embodiment illustrated in FIGS. 1 to 5. The second embodiment differs from the first embodiment in how to calculate a correction angle θm02 that is used to correct the motor neutral point θm01 calculated by the neutral point calculation circuit 71.

In theory, a value of the steering angle θs that is the X-axis value of a change point (coordinate values) where the slope of the specific stroke Cf with respect to the steering angle θs changes is equal to a value of the steering angle θs that is the X-axis value of a change point (coordinate values) where the slope of the conversion value θsm with respect to the steering angle θs changes. However, in actuality, due to the dimensional or assembly tolerances of components of the EPS 1, the value of the steering angle θs that is the X-axis value of the change point where the slope of the specific stroke Cf with respect to the steering angle θs changes is not equal to the value of the steering angle θs that is the X-axis value of the change point where the slope of the conversion value θsm with respect to the steering angle θs changes. The second embodiment focuses on this point to calculate the correction angle θm02 that is used to correct the motor neutral point θm01.

The slope of the specific stroke Cf with respect to the steering angle θs as used herein refers to a change in the specific stroke Cf per unit change in the steering angle θs. The slope of the conversion value θsm with respect to the steering angle θs as used herein refers to a change in the conversion value θsm per unit change in the steering angle θs. The change point as used herein refers to coordinate values that are on graph A of FIG. 7 and that serve as a boundary between a range where a change in the conversion value θsm per unit change in the steering angle θs or a change in the specific stroke Cf per unit change in the steering angle θs remains constant, and a range where the change in the conversion value θsm or the change in the specific stroke Cf varies.

Figure 7:
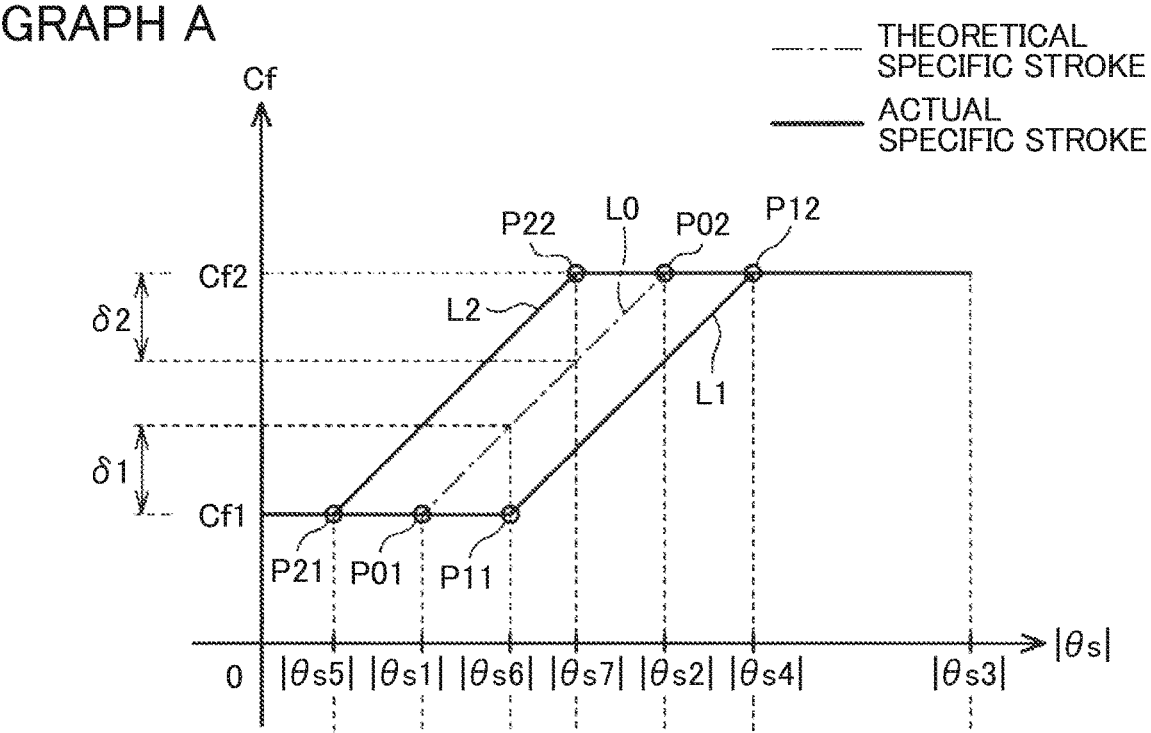
FIG. 7 illustrates graph A showing a relationship between a steering angle and a specific stroke according to a second embodiment, and graph B showing a map defining a relationship between the steering angle and a conversion value according to the second embodiment.
Figure 7:
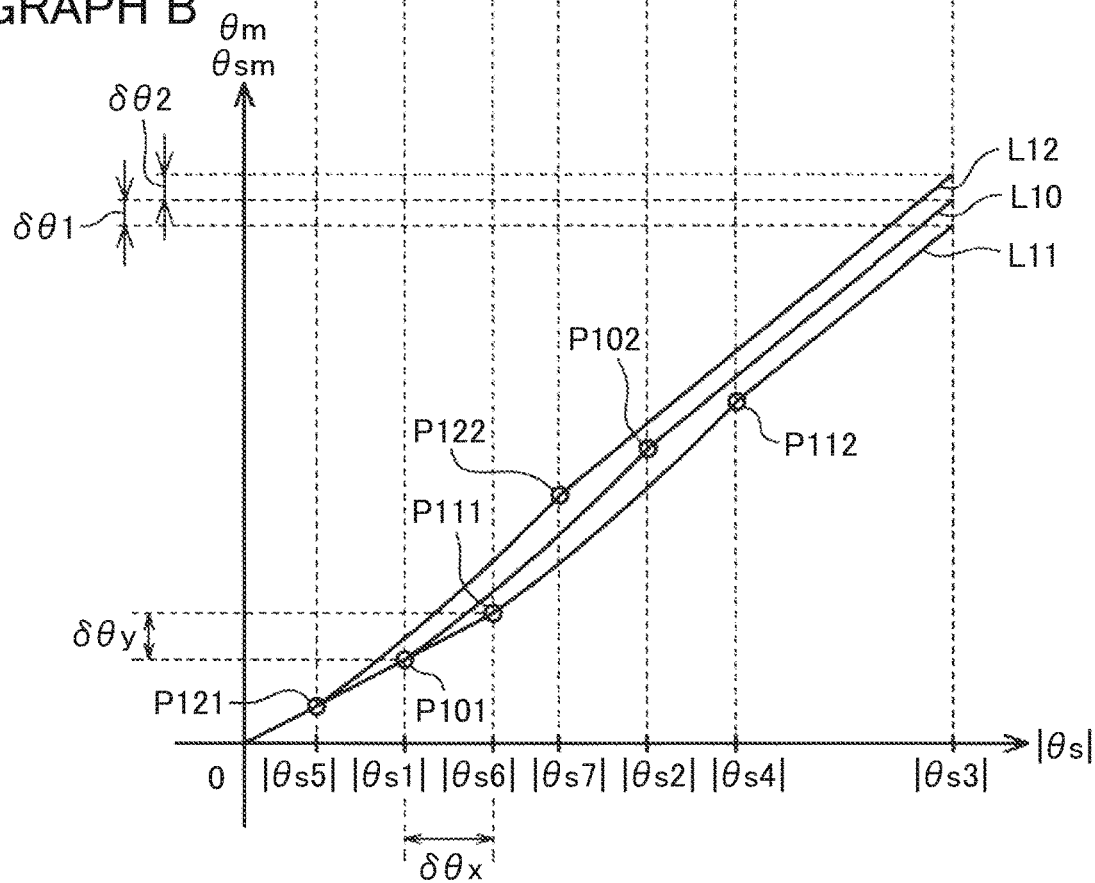

As shown in graph A and graph B of FIG. 7, in theory, the X-axis value of a change point P101 where the slope of the conversion value θsm with respect to the steering angle θs changes and the X-axis value of a change point P01 where the slope of the specific stroke Cf with respect to the steering angle θs changes are equal to each other and are both given by the absolute value of the first steering angle value θs1. Further, in theory, the X-axis value of a change point P102 where the slope of the conversion value θsm with respect to the steering angle θs changes and the X-axis value of a change point P02 where the slope of the specific stroke Cf with respect to the steering angle θs changes are equal to each other and are both given by the absolute value of the second steering angle value θs2.

As indicated by a characteristic line L1 in graph A of FIG. 7, when the actual value of the specific stroke Cf with respect to the steering angle $\theta s$ is smaller than the theoretical value of the specific stroke Cf indicated by a characteristic line L0, the X-axis value of a change point P111 where the slope of the conversion value $\theta sm$ with respect to the steering angle $\theta s$ changes and the X-axis value of a change point P11 where the slope of the specific stroke Cf with respect to the steering angle $\theta s$ changes are equal to each other and are both given by the absolute value of a sixth steering angle value $\theta s6$. The absolute value of the sixth steering angle value $\theta s6$ is greater than the absolute value of the first steering angle value $\theta s1$ and is less than the absolute value of the second steering angle value $\theta s2$. Further, in this case, the X-axis value of a change point P112 where the slope of the conversion value $\theta sm$ with respect to the steering angle $\theta s$ changes and the X-axis value of a change point P12 where the slope of the specific stroke Cf with respect to the steering angle $\theta s$ changes are equal to each other and are both given by the absolute value of the fourth steering angle value $\theta s4$.

As indicated by a characteristic line L2 in graph A of FIG. 7, when the actual value of the specific stroke Cf with respect to the steering angle $\theta s$ is greater than the theoretical value of the specific stroke Cf indicated by the characteristic line L0, the X-axis value of a change point P121 where the slope of the conversion value $\theta sm$ with respect to the steering angle $\theta s$ changes and the X-axis value of a change point P21 where the slope of the specific stroke Cf with respect to the steering angle $\theta s$ changes are equal to each other and are both given by the absolute value of the fifth steering angle value $\theta s5$. Further, in this case, the X-axis value of a change point P122 where the slope of the conversion value $\theta sm$ with respect to the steering angle $\theta s$ changes and the X-axis value of a change point P22 where the slope of the specific stroke Cf with respect to the steering angle $\theta s$ changes are equal to each other and are both given by the absolute value of a seventh steering angle value $\theta s7$. The absolute value of the seventh steering angle value $\theta s7$ is greater than the absolute value of the sixth steering angle value $\theta s6$ and is less than the absolute value of the second steering angle value $\theta s2$.

As described above, due to the dimensional or assembly tolerances of components of the EPS 1, the change point where the slope of the actual value of the rotation angle $\theta m$ of the motor 23 with respect to the steering angle $\theta s$ changes deviates from the change point where the slope of the theoretical value of the specific stroke Cf with respect to the steering angle $\theta s$ changes. The correction amount calculation circuit 72 utilizes this deviation to calculate the correction angle $\theta m02$ as follows.

On the basis of the steering angle $\theta s$ detected through the steering sensor 33 and the rotation angle $\theta m$ of the motor 23 detected through the relative angle sensor 26, the correction amount calculation circuit 72 calculates the slope of the rotation angle $\theta m$ of the motor 23 with respect to the steering angle $\theta s$ periodically at predetermined calculation intervals. The correction amount calculation circuit 72 monitors the calculated slopes to detect the change points P111, P112, P121, and P122. Specifically, the correction amount calculation circuit 72 detects, as the change points, coordinate values where a transition occurs between a first state and a second state. In the first state, the slope remains constant with a change in the steering angle $\theta s$. In the second state, the slope varies with a change in the steering angle $\theta s$.

For example, as indicated by the characteristic line L1 in graph A of FIG. 7, when the actual value of the specific stroke Cf with respect to the absolute value of the steering angle $\theta s$ is smaller than the theoretical value of the specific stroke Cf indicated by the characteristic line L0, the change point is detected as follows.

In this case, the relationship between the absolute value of the steering angle $\theta s$ and the actual value of the rotation angle $\theta m$ of the motor 23 is represented by a characteristic line L11 in graph B of FIG. 7. Thus, for example, assuming that the steering wheel 2 is operated from the steering neutral position, the change point P111 appears at the time when the absolute value of the steering angle $\theta s$ reaches the sixth steering angle value $\theta s6$.

When the change point P111 is detected, the correction amount calculation circuit 72 calculates a difference $\delta\theta x$ between the absolute value of the sixth steering angle value $\theta s6$ that is the X-axis value of the change point P111 and the absolute value of the first steering angle value $\theta s1$ that is the X-axis value of the change point P01 on the theoretical characteristic line L0 in graph A of FIG. 7, according to the following formula (G): $\delta\theta x = \theta s6$ (actual value) $- \theta s1$ (theoretical value) . . . (G). The correction amount calculation circuit 72 stores characteristics of the theoretical value of the specific stroke Cf with respect to the steering angle $\theta s$, indicated by the characteristic line L0 in graph A of FIG. 7.

Then, the correction amount calculation circuit 72 converts the difference $\delta\theta x$ in terms of the rotation angle $\theta m$ of the motor 23 using the total speed reduction ratio Gr, thereby calculating the correction angle $\theta m02$. The calculated correction angle $\theta m02$ has a value equal or approximate to a difference $\delta\theta y$ between the Y-axis value (the conversion value $\theta sm$) of the change point P101 on the theoretical characteristic line L10 and the Y-axis value (the rotation angle $\theta m$) of the change point P111 on the actual characteristic line L11. Since the correction angle $\theta m02$ calculated by the correction amount calculation circuit 72 is added to the motor neutral point $\theta m01$ calculated by the neutral point calculation circuit 71, the final motor neutral point $\theta m0$ is made equal or approximate to the actual motor neutral point.

In the following cases (G1), (G2), and (G3), the correction amount calculation circuit 72 calculates the correction angle $\theta m02$ in the same manner as described above for when the change point P111 is detected. (G1): Immediately after the drive source for propelling the vehicle is started, the steering wheel 2 is operated from a position between the X-axis value of the change point P111 and the X-axis value of the change point P112 in a direction that increases the absolute value of the steering angle $\theta s$. In the case (G1), the change point P112 first appears at the time when the absolute value of the steering angle $\theta s$ reaches the fourth steering angle value $\theta s4$.

(G2): Immediately after the drive source for propelling the vehicle is started, the steering wheel 2 is operated from a position beyond the X-axis value of the change point P112 in a direction that decreases the absolute value of the steering angle $\theta s$. In the case (G2), the change point P112 first appears at the time when the absolute value of the steering angle $\theta s$ reaches the fourth steering angle value $\theta s4$.

(G3): Immediately after the drive source for propelling the vehicle is started, the steering wheel 2 is operated from a position between the X-axis value of the change point P111 and the X-axis value of the change point P112 in the direction that decreases the absolute value of the steering angle $\theta s$. In the case (G3), the change point P111 first appears at the time when the absolute value of the steering angle $\theta s$ reaches the sixth steering angle value $\theta s6$.

As another example, as indicated by the characteristic line L2 in graph A of FIG. 7, when the actual value of the specific stroke Cf with respect to the steering angle $\theta s$ is greater than the theoretical value of the specific stroke Cf indicated by the characteristic line L0, the change point P121 or P122 is detected. In this case, the correction amount calculation circuit 72 calculates the correction angle θm02 in the same manner as described for when the change point P111 or P112 is detected.

Thus, the second embodiment has the following advantages in addition to the advantages (1) and (4) of the first embodiment. (5) The deviation between the theoretical and actual values of the specific stroke Cf with respect to the steering angle θs detected through the steering sensor 33 appears as the difference between the steering angle θs at the actual change point where the slope of the actual value of the rotation angle θm of the motor 23 with respect to the steering angle θs changes and the steering angle θs at the theoretical change point where the slope of the theoretical value of the specific stroke Cf with respect to the steering angle θs changes. Therefore, when the difference between the steering angle θs at the actual change point and the steering angle θs at the theoretical change point is converted in terms of the rotation angle θm of the motor 23 and then is reflected as the correction angle θm02 in the motor neutral point θm01 calculated by the neutral point calculation circuit 71, the final motor neutral point θm0 becomes more accurate.

Next, a steering control unit according to a third embodiment is described. The third embodiment has basically the same structure as the first embodiment illustrated in FIGS. 1 to 5. The third embodiment differs from the first embodiment in how to calculate a correction angle θm02 that is used to correct the motor neutral point θm01 calculated by the neutral point calculation circuit 71.

The correction amount calculation circuit 72 calculates a difference δθm between a theoretical value of the rotation angle θm of the motor 23 and an actual value of the rotation angle θm of the motor 23 detected through the relative angle sensor 26, as indicated by the following formula (I): δθm=θm (actual value)−θm (theoretical value) . . . (I). It is noted that the theoretical value of the rotation angle θm of the motor 23 is calculated on the basis of the formula (D) described in the first embodiment.

The correction amount calculation circuit 72 calculates an integral δiv of the difference δθm calculated on the basis of the formula (I) and then calculates the correction angle θm02 on the basis of the integral δiv.

For example, as indicated by the characteristic line L1 in graph A of FIG. 6, when the actual value of the specific stroke Cf with respect to the steering angle θs is smaller than the theoretical value of the specific stroke Cf indicated by the characteristic line L0, the correction angle θm02 is calculated as follows. In this case, the absolute value of the steering angle θs and the integral δiv of the difference δθm have the following relationship.

Figure 8:
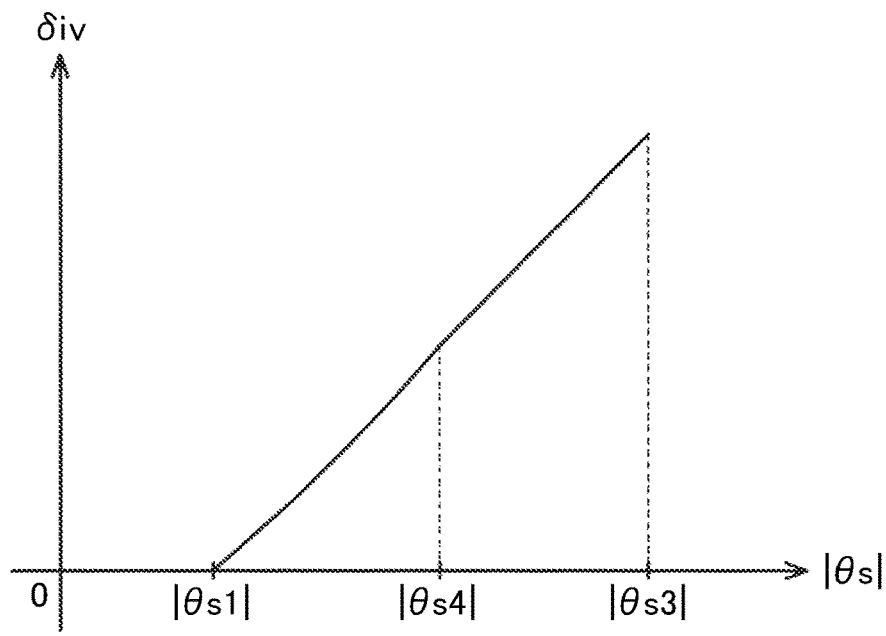
FIG. 8 illustrates graph showing a relationship between the absolute value of a steering angle and an integral according to a third embodiment.

The difference δθm between the theoretical and actual values of the rotation angle θm remains zero until the position of the steering wheel 2 with reference to the steering neutral position (θs=0) reaches the absolute value of the first steering angle value θs1. Accordingly, as shown in graph of FIG. 8, during this period, the integral δiv remains zero with an increase in the absolute value of the steering angle θs. The difference δθm between the theoretical and actual values of the rotation angle θm exists as a variable until the position of the steering wheel 2 reaches the absolute value of the fourth steering angle value θs4 after reaching the absolute value of the first steering angle value θs1. Accordingly, during this period, the integral δiv gradually increases nonlinearly with an increase in the absolute value of the steering angle θs. The difference δθm between the theoretical and actual values of the rotation angle θm exists as a constant after the position of the steering wheel 2 reaches the absolute value of the fourth steering angle value θs4. Accordingly, during this period, the integral δiv increases linearly with an increase in the absolute value of the steering angle θs.

As can be seen from graph A of FIG. 6 described in the first embodiment, the first steering angle value θs1 defines the start of a range where the theoretical value of the specific stroke Cf changes with an increase in the absolute value of the steering angle θs. The sixth steering angle value θs6 defines the start of a range where the actual value of the specific stroke Cf changes with an increase in the absolute value of the steering angle θs. The fourth steering angle value θs4 defines the end of the range where the actual value of the specific stroke Cf changes with an increase in the absolute value of the steering angle θs.

Figure 9:
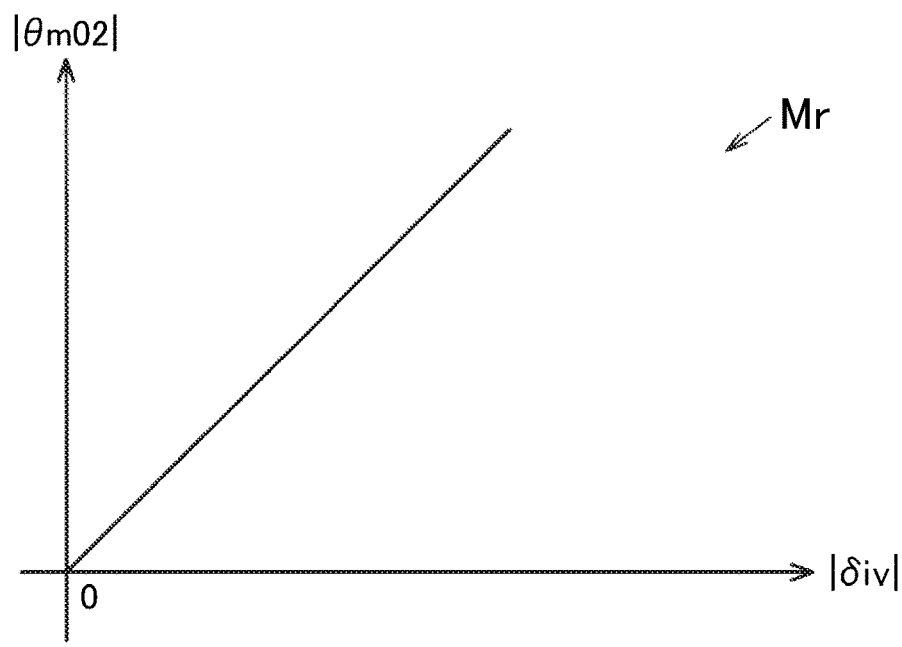
FIG. 9 illustrates a map defining a relationship between the integral and a correction angle according to the third embodiment.

The correction amount calculation circuit 72 calculates the correction angle θm02 using a correction amount calculation map Mr. The correction amount calculation map Mr defines a relationship between the integral δiv of the difference δθm and the absolute value of the correction angle θm02. The correction angle θm02 is set with respect to the integral δiv so as to eliminate the difference between the theoretical value of the conversion value θsm (in terms of the rotation angle θm of the motor 23) and the actual value of the rotation angle θm of the motor 23 with respect to the absolute value of the steering angle θs. As shown in graph of FIG. 9, the correction amount calculation map Mr has such a characteristic that the absolute value of the correction angle θm02 increases linearly with an increase in the integral div.

It is noted that the integral δiv in the correction amount calculation map Mr represents values when the absolute value of the steering angle θs detected through the steering sensor 33 reaches, by passing through the angle range (from |θs1| to |θs4|) where the integral δiv changes nonlinearly with a change in the steering angle θs, the angle range (from |θs4| to |θs3|) where the integral δiv changes linearly with a change in the steering angle θs or the angle range (from 0 to |θs1|) where the integral δiv remains constant at zero with a change in the steering angle θs. For example, the integral δiv in the correction amount calculation map Mr represents values when the steering position of the steering wheel 2 with reference to the steering neutral position (θs=0) reaches or exceeds the absolute value of the fourth steering angle value θs4.

Since the correction angle θm02 calculated by the correction amount calculation circuit 72 is added to the motor neutral point θm01 calculated by the neutral point calculation circuit 71, the final motor neutral point θm0 is made equal or approximate to the actual motor neutral point.

Likewise, as indicated by the characteristic line L2 in graph A of FIG. 6, when the actual value of the specific stroke Cf with respect to the steering angle θs is greater than the theoretical value of the specific stroke Cf indicated by the characteristic line L0, the correction angle θm02 is calculated on the basis of the integral δiv of the difference δθm between the theoretical and actual values of the rotation angle θm of the motor 23 in the same manner as described above.

In summary, the third embodiment has the following advantages in addition to the advantages (1) and (4) of the first embodiment. (6) The correction angle θm02 calculated in accordance with the integral δiv of the difference δθm between the conversion value θsm based on the theoretical value of the specific stroke Cf and the actual value of the rotation angle θm of the motor 23 with respect to the steering angle θs is reflected in the motor neutral point θm01 calculated by the neutral point calculation circuit 71. Thus, the final motor neutral point θm0 becomes more accurate.

(7) The correction amount calculation circuit 72 calculates the correction angle θm02 in accordance with the integral δiv, when the absolute value of the steering angle θs detected through the steering sensor 33 reaches, by passing through the angle range (from |θs1| to |θs4|) where the integral δiv changes nonlinearly with a change in the steering angle θs, the angle range (from |θs4| to |θs3|) where the integral δiv changes linearly with a change in the steering angle θs or the angle range (from 0 to |θs1|) where the integral δiv remains constant with a change in the steering angle θs.

When the difference δθm exists between the conversion value θsm based on the theoretical value of the specific stroke Cf and the actual value of the rotation angle θm of the motor 23 with respect to the steering angle θs, the integral δiv increases with an increase in the absolute value of the steering angle θs. In this case, if the difference δθm remains constant with a change in the steering angle θs, the integral δiv increases linearly with an increase in the steering angle θs. On the other hand, if the difference δθm varies with a change in the steering angle θs, the integral δiv increases nonlinearly with an increase in the steering angle θs. In contrast, when the difference δθm does not exist between the conversion value θsm based on the theoretical value of the specific stroke Cf and the actual value of the rotation angle θm of the motor 23 with respect to the steering angle θs, the integral δiv does not increase with an increase in the absolute value of the steering angle θs.

The angle range where the integral δiv changes nonlinearly with a change in the steering angle θs includes the angle range where the specific stroke Cf changes with respect to the steering angle θs. This is because since the angle range where the specific stroke Cf changes with respect to the steering angle θs is most likely to be influenced by the dimensional or assembly tolerances of components of the steering mechanism 20, the difference δθm is less likely to remain constant with a change in the steering angle θs in this angle range. That is, the influence of the dimensional or assembly tolerances of components of the steering mechanism 20 is more reflected in the difference δθm between the conversion value θsm based on the theoretical value of the specific stroke Cf and the actual value of the rotation angle θm of the motor 23 with respect to the steering angle θs in the angle range where the integral δiv changes nonlinearly with a change in the steering angle θs than in any other angle range of the entire steering range.

Thus, the difference δθm in the angle range that is more influenced by the dimensional or assembly tolerances of components of the steering mechanism 20 than any other angle range of the entire steering range is reflected in the integral δiv that is obtained when the absolute value of the steering angle θs reaches, by passing through the angle range where the integral δiv changes nonlinearly with a change in the steering angle θs, the angle range where the integral δiv changes linearly with a change in the steering angle θs or the angle range where the integral δiv remains constant with a change in the steering angle θs. Therefore, when the correction angle θm02 calculated in accordance with the integral δiv that reflects the difference δθm is reflected in the motor neutral point θm01, the final motor neutral point θm0 becomes more accurate.

Alternatively, the correction amount calculation circuit 72 may calculate the correction angle θm02 in accordance with the integral δiv, when the absolute value of the steering angle θs detected through the steering sensor 33 reaches, by passing through the angle range (from |θs1| to |θs4|) where the integral δiv changes nonlinearly with a change in the steering angle θs, the absolute value of the third steering angle value θs3 in the proximity of the stroke end, or the angle range (from 0 to |θs1|) where the integral δiv remains constant with a change in the steering angle θs. In this case, the integral δiv reflects the difference δθm in the angle range (from |θs1| to |θs4|) where the integral δiv changes nonlinearly with a change in the steering angle θs and in the angle range (from |θs4| to |θs3|) where the integral δiv changes linearly with a change in the steering angle θs. This makes the integral δiv more appropriate, and the correction angle θm02 to be reflected in the motor neutral point θm01 is calculated in accordance with this appropriate integral δiv.

Further alternatively, the correction amount calculation circuit 72 may calculate the correction angle θm02 in accordance with the integral δiv after the absolute value of the steering angle θs detected through the steering sensor 33 passes through the entire steering range of the steering wheel 2. In this case, the integral δiv reflects the difference δθm in the entire steering range of the steering wheel 2. This makes the integral δiv more appropriate, and the correction angle θm02 to be reflected in the motor neutral point θm01 is calculated in accordance with this appropriate integral δiv. Thus, the final motor neutral point θm0 becomes more accurate.

The first to third embodiments described above may be modified in various ways. Some example modifications are described below. Although the embodiments illustrate that the basic assist controlled variable calculation circuit 61 calculates the basic assist controlled variable I1* on the basis of the steering torque Th and the vehicle speed V, the basic assist controlled variable I1* may be calculated without using the vehicle speed V.

According to the embodiments, an absolute angle of more than 360 degrees corresponding to multiple rotations of the motor 23 is calculated on the basis of the rotation angle θm (relative angle) of the motor 23 with reference to the final motor neutral point θm0, and the steering absolute angle θsab is calculated on the basis of the calculated absolute angle of the motor 23. Alternatively, the absolute angle of the motor 23 with reference to the final motor neutral point θm0 may be used as a steering absolute angle (a so-called control steering angle) to control the EPS 1.

Although the embodiments illustrate that the steering angle calculation circuit 70 is included in the current command value calculation circuit 51, the steering angle calculation circuit 70 may be separate from the current command value calculation circuit 51. How the specific stroke Cf changes with respect to the steering angle θs may be modified, for example, to accommodate product specifications of the EPS 1. For example, the specifications of the first rack teeth 5a may be modified such that the specific stroke Cf continuously increases or decreases as the absolute value of the steering angle θs increases in an angle range from the first steering angle value θs1 to the third steering angle value θs3 in graph A of FIG. 6.

Although the embodiments illustrate that the second rack and pinion mechanism 27 performs conversion of rotation of the motor 23 into reciprocating motion of the rack shaft 5, this conversion may be performed by any other power converter, such as a ball screw mechanism.

The neutral point calculation circuit 71 may calculate the motor neutral point θm01 by taking into account the amount of twist of the torsion bar 31a in addition to the specific stroke Cf with respect to the steering angle θs. The amount of twist of the torsion bar 31*a* is calculated on the basis of, for example, the steering torque Th and elastic modulus of the torsion bar 31*a*. This approach calculates the motor neutral point θm01 more accurately, thus calculating the final motor neutral point θm0 more accurately.

Although the embodiments illustrate that the ECU 22 calculates the conversion value θsm by converting the steering angle θs detected through the steering sensor 33 in terms of the rotation angle θm of the motor 23 by referring to the conversion map Mc, the ECU 22 may calculate the conversion value θsm by any other suitable method. For example, the ECU 22 may calculate the conversion value θsm on the basis of a function where the steering angle θs detected through the steering sensor 33 is used as a variable.

The second rack and pinion mechanism 27 may be of a variable gear ratio type. That is, the specifications of the second rack teeth 5*b* may vary with the axial position of the rack shaft 5 so that a specific stroke (in this case, the distance the rack shaft 5 moves per one rotation of the pinion shaft 25, which in turn, the distance the rack shaft 5 moves per one rotation of the motor 23) varies with the rotation angle of the pinion shaft 25, which in turn, varies with the rotation angle of the motor 23. In this case, the conversion value θsm in the conversion map Mc is set taking into account both a theoretical specific stroke with respect to rotation of the pinion shaft 9 and a theoretical specific stroke with respect to rotation of the pinion shaft 25 (the motor 23). Thus, the conversion map Mc provides an appropriate conversion value θsm with respect to the steering angle θs to obtain an appropriate motor neutral point θm01, even when there is a difference between the specific stroke with respect to rotation of the pinion shaft 9 and the specific stroke with respect to rotation of the pinion shaft 25 (the motor 23).

What is claimed is:

1. A steering control unit for controlling a motor in accordance with a steering state, the motor being configured to generate power that is supplied to a rack-and-pinion steering mechanism of a variable gear ratio type, the steering control unit comprising:
   a steering angle calculation circuit configured to:
      determine a conversion value obtained by converting a steering angle detected by an absolute angle sensor, which is detected as an absolute value of an angle in a range of more than 360 degrees, into a rotation angle of the motor based on a theoretical specific stroke;
      calculate a motor neutral point by subtracting the conversion value from a rotation angle of the motor detected by a relative angle sensor, the motor neutral point being a rotation angle of the motor corresponding to a steering neutral position;
      calculate a correction amount of the calculated motor neutral point based on a deviation between the theoretical specific stroke and an actual specific stroke with respect to the steering angle detected by the absolute angle sensor, and correct the calculated motor neutral point based on the calculated correction amount; and
      calculate an absolute steering angle, as an absolute value of an angle in a range of more than 360 degrees, based on the corrected motor neutral point and the rotation angle of the motor detected by the relative angle sensor.

2. The steering control unit according to claim 1, wherein the steering angle calculation circuit is further configured to:
   calculate, as the deviation, a difference between the conversion value with respect to the detected steering angle and an actual value of the rotation angle of the motor with respect to the detected steering angle; and
   set the detected difference as the correction amount to correct the motor neutral point.

3. The steering control unit according to claim 1, wherein the steering angle calculation circuit is further configured to:
   calculate, as the deviation, a difference between a first value of the steering angle at a first change point where a slope of an actual value of the rotation angle of the motor with respect to the detected steering angle changes and a second value of the steering angle at a second change point where a slope of the theoretical specific stroke with respect to the detected steering angle changes;
   calculate the correction amount by converting the detected difference between the first value and the second value of the steering angle to terms of the rotation angle of the motor; and
   calculate the corrected motor neutral point based on the calculated correction amount.

4. The steering control unit according to claim 1, further comprising:
   a first calculation circuit configured to calculate a first controlled variable for the motor in accordance with steering torque;
   a second calculation circuit configured to calculate a second controlled variable as a compensation controlled variable for the motor in accordance with the steering angle, the second controlled variable being calculated by using the steering angle calculated by the steering angle calculation circuit; and
   a third calculation circuit configured to calculate a final controlled variable for the motor, the final controlled variable for the motor being calculated by adding together the first controlled variable and the second controlled.

5. A steering control unit for controlling a motor in accordance with a steering state, the motor being configured to generate power that is supplied to a rack-and-pinion steering mechanism of a variable gear ratio type, the steering control unit comprising:
   a steering angle calculation circuit configured to:
      determine a conversion value obtained by converting a steering angle detected by an absolute angle sensor, which is detected as an absolute value of an angle in a range of more than 360 degrees, into a rotation angle of the motor based on a theoretical specific stroke;
      calculate a motor neutral point by subtracting the conversion value from a rotation angle of the motor detected by a relative angle sensor, the motor neutral point being a rotation angle of the motor corresponding to a steering neutral position;
      calculate a deviation between the theoretical specific stroke and an actual specific stroke with respect to the steering angle detected by the absolute angle sensor, the deviation being an integral of a difference between the conversion value with respect to the detected steering angle and an actual value of the rotation angle of the motor with respect to the detected steering angle;
      calculate a correction amount of the calculated motor neutral point based on the detected integral and the calculated deviation, and correct the motor neutral point based on the calculated correction amount; and calculate an absolute steering angle, as an absolute value of an angle in a range of more than 360 degrees, based on the corrected motor neutral point and the rotation angle of the motor detected by the relative angle sensor.

6. The steering control unit according to claim 5, wherein wherein:

the steering angle calculation circuit is further configured to calculate the correction amount in accordance with the integral, when the absolute value of the detected steering angle reaches a first angle range by passing through a second angle range, in the first angle range, the integral changes linearly with a change in the steering angle or remains constant with the change in the steering angle and in the second angle range the integral changes nonlinearly with the change in the steering angle, in a first range that is in a proximity of the steering neutral position and where an absolute value of the steering angle is less than or equal to a first steering angle value, the theoretical specific stroke is constant at a first specific stroke value, in a second range where the absolute value of the steering angle is greater than the first steering angle value and is less than or equal to a second steering angle value, the theoretical specific stroke increases as the absolute value of the steering angle increases, and in a third range that is in a proximity of a steering limit position and where the absolute value of the steering angle is greater than the second steering angle value, the theoretical specific stroke is constant at a second specific stroke value.

\* \* \* \* \*